Jan. 10, 1961   P. G. PRIAROGGIA   2,967,899
STOP JOINTS AND FEEDING JOINTS FOR SINGLE-CORE
OIL-FILLED ELECTRIC CABLES
Filed June 5, 1956
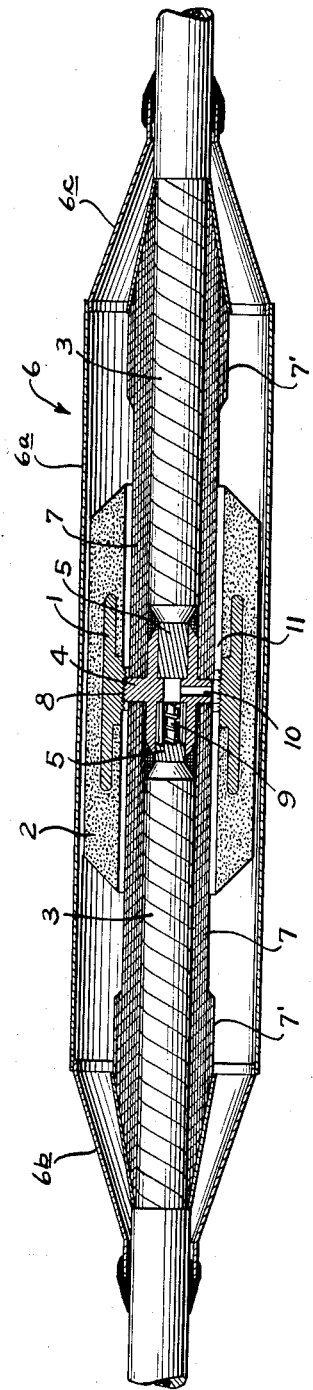
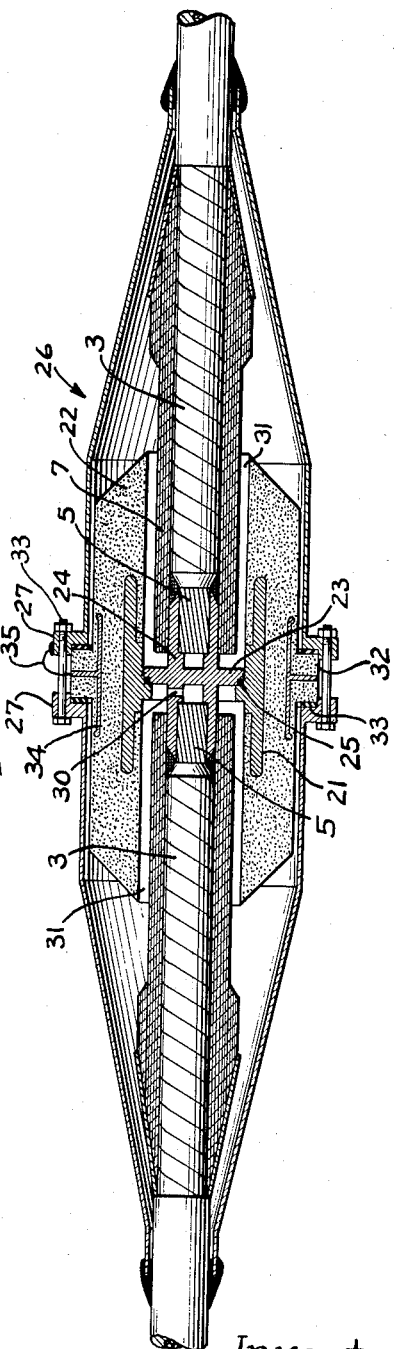
Inventor
PAOLO G. PRIAROGGIA
by: Morris Spector
atty.

United States Patent Office 2,967,899
Patented Jan. 10, 1961

2,967,899

STOP JOINTS AND FEEDING JOINTS FOR SINGLE-CORE OIL-FILLED ELECTRIC CABLES

Paolo Gazzana Priaroggia, Milan, Italy, assignor to Pirelli Societá per Azioni, M.lan, Italy Filed June 5, 1956, Ser. No. 589,458

Claims priority, application Italy June 15, 1955

9 Claims. (Cl. 174—22)

This application is a continuation in part of my application Serial No. 424,729, filed April 21, 1954.

The present invention relates to improvements in the construction of joints for high tension oil-filled electric cables and more particularly to the construction of feeding joints and of stop joints for single-core cables.

In my parent application above referred to there are shown various types of stop joints which include a central metallic block or socket embedded in a solid dielectric mass, which block acts as an electric screen to obtain favorable distribution of the electric field at the joint and at the same time serves as a ferrule to establish the metallic connection between cable conductors.

It is one of the objects of the present invention to provide an electrode which can act as an electric screen and a conductive ferrule for the conductors, as above set forth, but wherein the electrode and the ferrule are made of separate parts so that the ferrule can be connected to the conductors and then the ferrule and the electrode may be connected to one another, all in a manner to facilitate the making of the overall connections.

It is a further object of the present invention to provide a connector wherein the ferrule that connects the cable conductors is completely screened by a conductive electrode which is separated from and embedded within a solid dielectric mass, preferably constituted of a casting of synthetic resins of the ethoxylinic type, in case loaded with inorganic excipients (as powdered quartz or kaolin) and suitably added with hardening agents as, for instance, the resins known on the market under the trade name "Araldit." The present improvement is applicable both to feeding joints and to stop joints for high tension single-conductor oil-filled cables. The practical realization of the principles of the present invention involves, for some joints, some constructive shapes differing from those indicated in my above-mentioned application. The present invention aims at the construction of a feeding joint or a stop joint, for oil-filled single-conductor cables, wherein the joint is screened by an electrode embedded in a casting of synthetic resins of the ethoxylinic type, so arranged that the duct for the inlet or outlet of oil from the ferrule of the cable conductors is completely shielded against high electric stresses.

The attainment of the above and further objects of the present invention will be apparent from the following specification taken in conjunction with the accompanying drawings forming a part thereof.

In the drawings:

Fig. 1 is a longitudinal sectional view through a feeding joint for a single-conductor oil-filled electric cable; and Fig. 2 is a longitudinal sectional view of a stop joint for single-conductor oil-filled cables.

In the drawings, like reference numerals designate like parts throughout.

Reference may now be had more particularly to Fig. 1. This illustrates a feeding joint between two single-conductor oil-filled electric cables 3—3 the corresponding stranded conductors 5 of which are electrically connected together. The cable conductor is hollow, consisting of strands of wire surrounding an open helix which constitutes an axial channel or oil duct 9 for the passage of oil lengthwise of the cable. A special metal ferrule 4 serves to establish electrical connections between the two cable conductors 5. The ferrule is provided with an inner radial duct 10 for the outlet (or inlet) of the oil, as is conventional in feeding joints, which duct 10 extends radially between a transverse bore through the ferrule adjacent to the outer periphery thereof and an inner longitudinal bore in the ferrule that connects the longitudinally extending ducts 9 of the connected set of stranded cable conductors 5. The ferrule 4 is surrounded by an electrode 1, made of metal or other electrically conductive material. The electrode 1 is embedded in a solid sleeve 2 of dielectric of ethoxylinic resins, preferably of the type set forth in my application Serial No. 424,729, or my application Serial No. 550,741, and the conductive material of the elecrode may also be that set forth in my application Serial No. 424,729, reference being made to the above-mentioned applications for a further description of the dielectric the same as though that were incorporated herein. It is sufficient here to state that the dielectric is of the type described in the introductory part of this specification. The synthetic resins of the "epoxy" type have exceptionally high adherence to the metallic surfaces embedded therein and an absence of empty spaces or voids in the casting, and are of a low thermal coefficient of linear expansion approximating that of the embedded electrode 1, and have high dielectric properties, all as set forth in my pending applications above referred to.

Electrical connection between the ferrule 4 and the screen 1 may be carried out in any desired manner, for instance, by threading the ferrule into the electrode along threads 8 formed in the electrode and cooperating with similar threads formed on the periphery of the ferrule.

The outlet of the oil of the conductor along the hollow space 11 between hand applied insulation 7 on the cable end and the dielectric sleeve 2 wherein the electrode 1 is embedded is almost completely screened. In this manner the duct for the outlet of the oil from the ferrule is completely shielded against high electric stresses.

The casing 6 of the joint may be composed of three parts, namely a central part 6a having a cylindrical shape, and two conical end caps 6b and 6c all assembled together.

The assembly of this joint is carried out as follows: One end cap of the joint casing 6, joined to the central cylindrical portion of the casing, is placed over the end of one cable conductor and moved back along the cable sheath to be out of the way, and the other end cap of the housing is placed likewise over the other cable conductor and moved back along the cable sheath. The sleeve 2 wherein the electrode 1 is embedded is then placed over one cable conductor and moved back over its cable sheath to be out of the way. The cable conductors are prepared for jointing in the usual manner, as by baring the ends of the cable conductors 5 of insulation and stepping back the insulation at the bared ends of the conductors in the usual manner. The bared ends of the conductors are then inserted into the respective sockets of the ferrule 4, clamping them in place by pressure, or joining them by other known methods, and then hand applying insulating tapings or tubes 7 on the cable ends from which the lead or aluminum cable sheaths had been previously removed. The prefabricated insulating sleeve 2 wherein the electrode 1 is embedded is moved over toward the ferrule 4 and is screwed onto the ferrule 4 by rotating the sleeve 2. Then additional insulation wrappings 7' are applied as conventional. The unit is then enclosed by the cylindrical casing 6 comprising the central cylindrical part 6a to which the end caps 6b and 6c are soldered, the opposite ends of the end caps being then soldered or sweated to the respective cable sheaths to form a fluid-tight, air-tight casing as is conventional.

The principles of the present invention as exemplified in the feeding joint of Fig. 1 may be carried out in a stop joint for oil-filled cables, as illustrated in Fig. 2. In this case, a ferrule 24 which connects the bared cable conductors 5 is of such shape as to close off communication between the insulating fluid contained in the two sections of the cable being joined. The ferrule 24 comprises a one-piece metal member having axially aligned, oppositely facing sockets that are incommunicable with one another. The ferrule is provided with an imperforate peripherally extending annular flange 23 integral with and surrounding the sockets. A cylindrical electrode 21, of metal or other conducting material, which electrode corresponds to the electrode 1 of Fig. 1, is embedded in a sleeve 22 which is a dielectric mass of the same compositions as the sleeve 2 previously described. The electrode 21 and the ferrule 24 are secured together in any desired manner as, for instance, by being screwed together as in Fig. 1. Complete liquid tightness is secured by providing the electrode 21 with a short inwardly extending annular flange and interposing an annular sealing gasket 25 between that flange and the flange on the ferrule, so as to completely separate and seal off the hollow space 31 on one side of the ferrule from the corresponding space on the opposite side of the ferrule.

Each socket of the ferrule 24 is provided with a duct 30 for oil. The duct 30 of each conductor receiving socket communicates with the corresponding hollow space 31 and with the longitudinal oil duct in the associated conductor 5.

The ferrule 24 with the ducts 30 for oil is entirely screened by the electrode 21 which is made of metal or of other conductive material the same as the electrode 21 of Fig. 1, previously described. The electrode 21, but not the ferrule, is embedded in the dielectric sleeve 22.

The casing of the joint of Fig. 2, indicated at 26, comprises two similar parts each provided with an annular peripheral flange 27. The sleeve 22 has a peripheral collar 32 at the center thereof. A sealing gasket 33 is interposed between the flange 27 of one casing half and the collar 32 on the sleeve 22, and a similar gasket is interposed between the flange 27 on the other casing half and the collar 32. The two flanges 27—27 are bolted together to form a liquid-tight and air-tight connection between the flanges 27 of the casing 26 and the collar 32. The junction between the two parts of the casing 26 and the sleeve 22 may be electrically screened or shielded in order to provide a uniform electric field in the region of the juncture between the two casing parts. This shielding may comprise a metallic screen 34 which is embedded in the solid dielectric 22 and is grounded to the casing 26 by a grounded wire 35.

The prefabricated sleeve 22 is positioned on one of the cable cores to be connected, prior to the application of the insulating tubes or casings 7. The assembly of the stop joint is analogous to that described above for the feeding joint.

In the embodiments of the present invention herein illustrated, the ferrule that provides electrical connection between the two cable conductors 5 and provides for communication with the oil ducts in the respective cable conductors is mechanically separate from but electrically connected to a screen or shield that is embedded in the solid dielectric while the ferrule itself is not embedded in the solid dielectric.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A connector for high voltage oil-filled hollow conductor cables, said connector comprising a mass of solid insulation having a longitudinal bore therethrough for receiving the ends of cable conductors to be connected, a connecting ferrule within the bore, said connecting ferrule having an oil flow opening in the wall thereof for oil flow to and from the cable conductor through the ferrule, said ferrule being spaced from the wall of the bore to form an oil duct from the oil flow opening in the ferrule through the bore to the outside of said mass of insulation, a screening electrode embedded within the mass of solid insulation and surrounding the ferrule, said ferrule being separable and distinct from but mechanically and electrically connected to the electrode, the electrode surrounding the portion of the ferrule where the oil flow opening is located and surrounding a portion of the duct and terminating short of the ends of the mass of solid insulation, whereby the duct is protected against high electric stresses, a second screening electrode embedded in the mass of solid insulation concentric with but spaced from the first screening electrode and insulated therefrom, and a grounding connection to said second electrode.

2. A joint between high voltage oil-filled hollow conductor cables, said joint including a connector comprising a homogenous mass of solid insulation having a longitudinal bore therethrough for receiving the ends of cable conductors to be connected, a connecting ferrule within the bore, said connecting ferrule having an oil flow opening in the wall thereof for oil flow to and from the cable conductor through the ferrule, said ferrule being spaced from the wall of the bore to form an oil duct from the oil flow opening in the ferrule through the bore to the outside of said mass of insulation, a screening electrode embedded within the mass of solid insulation and surrounding the ferrule, said ferrule being separable and distinct from but mechanically and electrically connected to the electrode, a sleeve of insulation surrounding the end of the cable conductor and extending into the bore and surrounding the adjacent end of the ferrule, the duct being between the sleeve of insulation and the wall of the bore in the mass of solid insulation, the electrode surrounding the portion of the ferrule where the oil flow opening is located and surrounding a portion of the sleeve of insulation and terminating short of the ends of the mass of solid insulation, whereby the duct is protected against high electric stresses.

3. A joint between high voltage oil-filled hollow conductor cables, said joint including a connector comprising a mass of solid insulation having a longitudinal bore therethrough for receiving the ends of cable conductors to be connected, a connecting ferrule within the bore, said connecting ferrule having an oil flow opening in the wall thereof for oil flow to and from the cable conductor through the ferrule, said ferrule being spaced from the wall of the bore to form an oil duct from the oil flow opening in the ferrule through the bore to the outside of said mass of insulation, a screening electrode embedded within the mass of solid insulation and surrounding the ferrule, said ferrule being separable and distinct from but mechanically and electrically connected to the electrode, a sleeve of insulation surrounding the end of the cable conductor and extending into the bore and surrounding the adjacent end of the ferrule, the duct being between the sleeve of insulation and the wall of the bore in the mass of solid insulation, the electrode surrounding the portion of the ferrule where the oil flow opening is located and surrounding a portion of the sleeve of insulation and terminating short of the ends of the mass of solid insulation, whereby the duct is protected against high electric stresses, a second screening electrode embedded in the mass of solid insulation concentric with but spaced from the first screening electrode and insulated therefrom, and a grounding connection to said second electrode.

4. A joint for high voltage oil-filled hollow conductor cables, said joint including connector comprising a mass of solid insulation having a longitudinal bore therethrough for receiving the ends of cable conductors to be connected, a connecting ferrule within the bore, said connecting ferrule having an oil flow opening in the wall thereof for oil flow to and from the cable conductor through the ferrule, said ferrule being spaced from the wall of the bore to form an oil duct from the oil flow opening in the ferrule through the bore to the outside of said mass of insulation, a screening electrode embedded within the mass of solid insulation and surrounding the ferrule, said ferrule being separable and distinct from but mechanically and electrically connected to the electrode, a sleeve of insulation surrounding the end of the cable conductor and extending into the bore and also surrounding the adjacent end of the ferrule, said ferrule making a complete hermetic junction with the electrode and closing off the flow of oil through the joint from one side of the ferrule to the other, the electrode surrounding the portion of the ferrule where the oil flow opening is located and surrounding a portion of the sleeve of insulation and terminating short of the ends of the mass of solid insulation, whereby the duct is protected against high electric stresses.

5. A joint for high voltage oil-filled hollow conductor cables, said joint including connector comprising a mass of solid insulation having a longitudinal bore therethrough for receiving the ends of cable conductors to be connected, a connecting ferrule within the bore, said connecting ferrule having an oil flow opening in the wall thereof for oil flow to and from the conductor through the ferrule, said ferrule being spaced from the wall of the bore to form an oil duct from the oil flow opening in the ferrule through the bore to the outside of said mass of insulation, a screening electrode embedded within the mass of solid insulation and surrounding the ferrule, said ferrule being separable and distinct from but mechanically and electrically connected to the electrode, a sleeve of insulation surrounding the end of the cable conductor and extending into the bore and also surrounding the adjacent end of the ferrule, said ferrule making a complete hermetic junction with the electrode and closing off the flow of oil through the joint from one side of the ferrule to the other, the electrode surrounding the portion of the ferrule where the oil flow opening is located and surrounding a portion of the sleeve of insulation and terminating short of the ends of the mass of solid insulation, whereby the duct is protected against high electric stresses, a second screening electrode embedded in the mass of solid insulation concentric with but spaced from the first screening electrode and insulated therefrom, and a grounding connection to said second electrode.

6. A connector for establishing electrical and mechanical connection with the conductors of high voltage cables, said connector being a prefabricated article of manufacture apart from the cable conductors it is to connect and comprising a homogeneous mass of solid insulation having a longitudinal bore therethrough for receiving the ends of cable conductors to be connected, a screening electrode embedded within the mass of solid insulation with a portion of the electrode terminating within said bore, a connecting ferrule within the bore and spaced from the solid insulation of the bore and surrounded by the electrode, said ferrule being separable and distinct from but mechanically and electrically connected to said electrode at said portion of the electrode within the bore, the ends of the screening electrode extending beyond the ferrule in a direction lengthwise thereof and being buried in the mass of solid insulation with some of said insulation extending between the ferrule and the electrode and surrounding the ferrule but spaced therefrom, and means for maintaining the potential difference through the mass of solid insulation substantially equal to the potential of the ferrule.

7. A joint between high voltage oil-filled hollow conductor cables, said joint including a connector comprising a sleeve in the form of a prefabricated homogeneous mass of solid insulation having a longitudinal bore therethrough for receiving the ends of cable conductors to be connected, a screening electrode embedded within the mass of solid insulation with a portion of the electrode terminating within said bore, a connecting ferrule within the bore and spaced from the solid insulation of the bore and surrounded by the electrode, said ferrule being separable and distinct from but mechanically and electrically connected to said electrode at said portion of the electrode within the bore, the ends of the screening electrode extending beyond the ferrule in a direction lengthwise thereof and being buried in the mass of solid insulation with some of said insulation extending between the ferrule and the electrode and surrounding the ferrule but spaced therefrom, the cable conductors being electrically and mechanically connected to said ferrule, and a mass of applied insulation extending into the bore and surrounding the portion of the cable conductor within the bore and extending over and surrounding the ferrule but spaced from the wall of said longitudinal bore.

8. An improved structure for extending electrical connections with a high tension single-core oil-filled cable that includes a stranded conductor which is hollow to constitute an oil channel and which conductor is surrounded by solid cable insulation, characterized in that said structure comprises a conductive ferrule having an opening for receiving the bared end of the cable conductor to be joined, said ferrule electrically and mechanically connecting with said conductor end, an additional solid insulation covering the cable insulation within the joint and extending over the conductor-receiving end of the ferrule, said ferrule having an oil flow opening in the wall thereof for oil flow to and from the channel through the ferrule; a prefabricated monolithic block of homogeneous solid insulation having a longitudinal bore for receiving the end of the cable conductor to be connected, the wall of said bore being spaced from the additional solid insulation to form an oil duct from the oil flow opening in the ferrule through the bore to the outside of said monolithic block, a screening electrode embedded in said monolithic block and terminating short of the ends thereof, said electrode being completely embedded in the monolithic block but for a central portion projecting so as to constitute a part of the wall of the bore, said electrode being separable and distinct from, but mechanically and electrically connected to the ferrule whereby the oil duct is protected against high electric stresses.

9. A joint between high voltage oil filled hollow conductor cables wherein each cable conductor is surrounded by solid cable insulation, said joint including a prefabricated monolithic block comprising a sleeve of homogeneous solid dielectric having longitudinal bores for receiving the ends of cable conductors to be connected, a connecting ferrule within the block, said connecting ferrule having an oil flow opening in the wall thereof for oil flow to and from at least one of the cable conductors through the ferrule, said ferrule having openings for receiving the bared ends of the cable conductors to be connected, an additional layer of solid insulation surrounding the cable insulation within the joint and extending over the adjacent end of the ferrule, means including said additional insulation forming an oil duct from the oil flow opening in the ferrule through the bore to the outside of said sleeve of solid homogeneous insulation, a central portion of said ferrule projecting from said additional insulation, a screening electrode completely embedded in said sleeve of solid homogeneous insulation but forming a central portion which projects radially inward so as to be at least flush with the wall of the bore, said electrode being separable and distinct from, but mechanically and electrically connected to the ferrule and surrounding the ferrule, the sleeve of solid homogeneous insulation extending axially beyond the electrode an amount in excess of the thickness of the solid cable insulation and said sleeve surrounding the cable insulation and its additional insulation, whereby the oil duct is protected against high electric stresses.

References Cited in the file of this patent

UNITED STATES PATENTS

| | | |
|---|---|---|
| 1,309,158 | Tanner et al. | July 8, 1919 |
| 1,628,438 | Simons | May 10, 1927 |
| 1,723,846 | Eby | Aug. 6, 1929 |
| 1,784,881 | Rah | Dec. 16, 1930 |
| 1,819,882 | Eby | Aug. 18, 1931 |
| 1,979,148 | Eby | Oct. 30, 1934 |
| 1,979,150 | Emanueli | Oct. 30, 1934 |
| 1,988,279 | Kirch | Jan. 15, 1935 |
| 2,049,835 | Emanueli | Aug. 4, 1936 |
| 2,093,305 | Buck | Sept. 14, 1937 |
| 2,241,505 | Cuttler | May 13, 1941 |
| 2,396,283 | Papst | Mar. 12, 1946 |
| 2,406,676 | Cambitta | Aug. 27, 1946 |
| 2,442,366 | Leno | June 1, 1948 |

FOREIGN PATENTS

| | | |
|---|---|---|
| 577,248 | Great Britain | May 10, 1946 |
| 924,742 | France | Mar. 10, 1947 |
| 633,594 | Great Britain | Dec. 19, 1949 |